US012719937B2

(12) United States Patent
Kanonakis et al.

(10) Patent No.: US 12,719,937 B2
(45) Date of Patent: Aug. 25, 2026

(54) SYSTEM AND METHOD FOR A SCALABLE NETWORK ARCHITECTURE FOR DIVERSE NETWORK ELEMENT MANAGEMENT

(71) Applicant: VERIZON PATENT AND LICENSING INC., Basking Ridge, NJ (US)

(72) Inventors: Konstantinos Kanonakis, Dallas, TX (US); Sanjay Nayak, San Jose, CA (US); Manoj Chokka, Andhra Pradesh (IN); Ashoka Chikkanayakanahalli Kote, Edison, NJ (US); Yaojun Zeng, San Jose, CA (US); Songtao Qiu, Frisco, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 225 days.

(21) Appl. No.: 18/231,270

(22) Filed: Aug. 8, 2023

(65) Prior Publication Data

US 2025/0055885 A1 Feb. 13, 2025

(51) Int. Cl.

| | |
|---|---|
| ***H04L 65/10*** | (2022.01) |
| ***H04L 41/06*** | (2022.01) |
| ***H04L 41/0806*** | (2022.01) |
| ***H04L 41/0816*** | (2022.01) |
| ***H04L 43/02*** | (2022.01) |
| ***H04L 45/02*** | (2022.01) |

(52) U.S. Cl.
CPC .......... *H04L 65/1013* (2013.01); *H04L 41/06* (2013.01); *H04L 41/0806* (2013.01); *H04L 41/0816* (2013.01); *H04L 43/02* (2013.01); *H04L 45/02* (2013.01)

(58) Field of Classification Search
CPC . H04L 65/1013; H04L 41/06; H04L 41/5009; H04L 67/1095
See application file for complete search history.

(56) References Cited

U.S. PATENT DOCUMENTS

| | | | | |
|---|---|---|---|---|
| 12,020,077 | B1 * | 6/2024 | Rohatgi | G06F 9/505 |
| 2013/0110757 | A1 * | 5/2013 | Calippe | G06N 5/02 706/47 |
| 2017/0199770 | A1 * | 7/2017 | Peteva | G06F 9/5088 |
| 2018/0048587 | A1 * | 2/2018 | Bai | H04L 41/5077 |

* cited by examiner

*Primary Examiner* — John A Follansbee
*Assistant Examiner* — Christopher P Cadorna

(57) ABSTRACT

Disclosed are systems and methods for a network framework for managing network elements (NEs) of a wireless/cellular and wireline network. The framework enables the scaling of a quantity, diversity and availability of NEs on/within a network via secure, efficient handling of multiple connectivity protocols, management protocols and/or NE data models. The framework can operate to provide a newly configured microservice architecture for the performance of NE management that is based on the specifics of NE types and/or NE protocols. Such architecture can operate as a collection (e.g., cluster) of microservices (or components) that can be independently scaled and can enable services to communicate with one another at the service level. The disclosed framework provides customized service technologies for each component/service in a configured manner so as to cluster services to specific needs/requests of each NE.

19 Claims, 5 Drawing Sheets

SYSTEM AND METHOD FOR A SCALABLE NETWORK ARCHITECTURE FOR DIVERSE NETWORK ELEMENT MANAGEMENT

BACKGROUND INFORMATION

Cellular, wireless and wireline network architectures include network elements (NEs) that make-up and/or enable the network infrastructure. Such elements can work together to facilitate communication between connected devices and enable functionality of such networks.

BRIEF DESCRIPTION OF THE DRAWINGS

The features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION OF EXAMPLE EMBODIMENTS

According to some embodiments, the disclosed systems and methods provide a novel computerized framework for managing NEs. As discussed herein, the disclosed framework enables the scaling of a quantity, diversity and availability of NEs on/within a network. Accordingly, the disclosed framework enables the secure, efficient handling of multiple connectivity protocols (e.g., secure shell (SSH), google remote procedure call (gRPC), and the like), management protocols (e.g., network configuration protocol (NETCONF), Google Network Management Interface (gNMI), simple network management protocol (SNMP), command line interface (CLI), transport layer interface (TLI), and the like) and/or NE data models, which can be vendor/third-party based (e.g., base station data model, storage array data model, network element management (NEM) data model, firewall data model, switch data model, router data model, and the like).

According to some embodiments, the disclosed framework can operate to provide a configured microservice architecture for the performance of NE management that is based on the specifics of NE types and/or NE protocols. As provided below in at least FIG. 2, and the discussion of engine 200 respective to FIGS. 3 and 4, the disclosed framework can operate as a collection (e.g., cluster) of microservices (or components) that can be independently scaled (e.g., up and/or down) and can enable services to communicate with one another at the service level. This, among other benefits, enables a built-in high availability (HA) functionality due to multiple NEs being applied/executed per service instance. Moreover, as evident from the discussion herein, the operation of the disclosed framework provides flexible handling of NE management service instances respective to registrations, configurations and/or disconnections from NEs. The disclosed framework provides customized service technologies for each component/service in a configured manner so as to cluster services to specific needs/requests of each NE.

It should be understood that while the instant disclosure may be directed to wireless networks, it is not so limiting, as application of the disclosed systems and methods can correspond to other types of networks, for example, wired or wireline networks, without departing from the scope of the instant disclosure.

Figure 1:
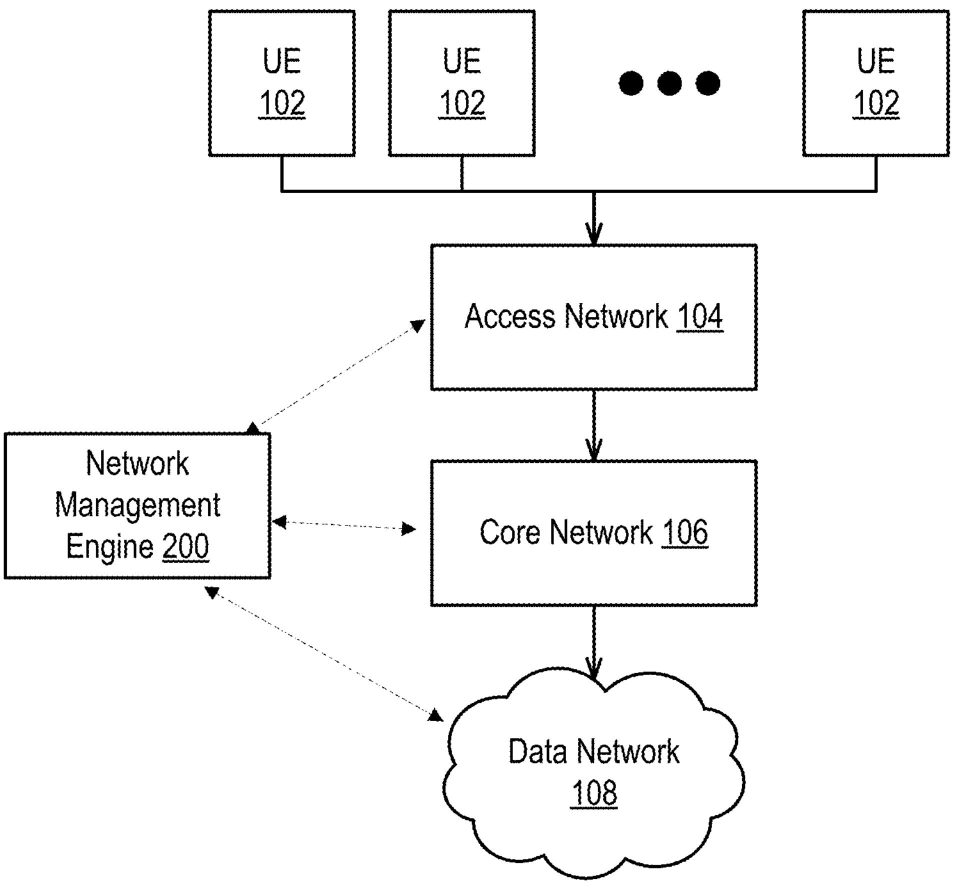
FIG. 1 is a block diagram of an example network architecture according to some embodiments of the present disclosure.

FIG. 1 is a block diagram of an example network architecture according to some embodiments of the present disclosure. In the illustrated embodiment, UE 102 accesses a data network 108 via an access network 104 and a core network 106. In the illustrated embodiment, UE 102 comprises any computing device capable of communicating with the access network 104. As examples, UE 102 may include mobile phones, tablets, laptops, sensors, Internet of Things (IoT) devices, autonomous machines, wired devices, wireless handsets, gaming consoles, unmanned aerial vehicles (UAVs) unmanned ground vehicles (UGVs), and any other devices equipped with a cellular or wireless or wired transceiver. One example of a UE is provided in FIG. 5.

In the illustrated embodiment, the access network 104 comprises a network allowing network communication with UE 102. In general, the access network 104 includes at least one base station that is communicatively coupled to the core network 106 and coupled to zero or more UE 102.

In some embodiments, the access network 104 comprises a cellular access network, for example, a 5G network. In an embodiment, the access network 104 can include a NextGen Radio Access Network (NG-RAN). In an embodiment, the access network 104 includes a plurality of next Generation Node B (e.g., eNodeB and gNodeB) base stations connected to UE 102 via an air interface. In one embodiment, the air interface comprises a New Radio (NR) air interface. For example, in a 5G network, individual user devices can be communicatively coupled via an X2 interface.

In the illustrated embodiment, the access network 104 provides access to a core network 106 to the UE 102. In the illustrated embodiment, the core network may be owned and/or operated by a network operator (NO) and provides wireless connectivity to UE 102. In the illustrated embodiment, this connectivity may comprise voice and data services.

At a high-level, the core network 106 may include a user plane and a control plane. In one embodiment, the control plane comprises network elements and communications interfaces to allow for the management of user connections and sessions. By contrast, the user plane may comprise network elements and communications interfaces to transmit user data from UE 102 to elements of the core network 106 and to external network-attached elements in a data network 108 such as the Internet.

In the illustrated embodiment, the access network 104 and the core network 106 are operated by a NO. However, in some embodiments, the networks (104, 106) may be operated by a private entity and may be closed to public traffic. For example, the components of the network 106 may be provided as a single device, and the access network 104 may comprise a small form-factor base station. In these embodiments, the operator of the device can simulate a cellular network, and UE 102 can connect to this network similar to connecting to a national or regional network.

In some embodiments, the access network 104, core network 106 and data network 108 can be configured as a multi-access edge computing (MEC) network, where MEC or edge nodes are embodied as each UE 102 and are situated at the edge of a cellular network, for example, in a cellular base station or equivalent location. In general, the MEC or edge nodes may comprise UEs that comprise any computing device capable of responding to network requests from another UE 102 (referred to generally for example as a client) and is not intended to be limited to a specific hardware or software configuration of a device.

FIG. 1 further includes network management engine 200 which is configured for performing NE management, inclusive of NE registration, configuration and execution of network requests. Network management engine 200 can be a special purpose machine or processor, and could be hosted by or integrated into functionality associated with access network 104, core network 106 and/or data network 108, or some combination thereof. For example, network management engine 200 can be configured to connect to and/or integrate with eNodeB and gNodeB components (of access network 104) that connect core network 106 to UE 102. In another example, network management engine 200 can be hosted on a 5G Core—e.g., on network 106.

In some embodiments, network management engine 200 can be implemented on an server operating within data network 108. For example, in some embodiments, engine 200 can be hosted by any type of network server, such as, but not limited to, an edge node or server, application server, content server, web server, and the like, or any combination thereof.

Figure 2:
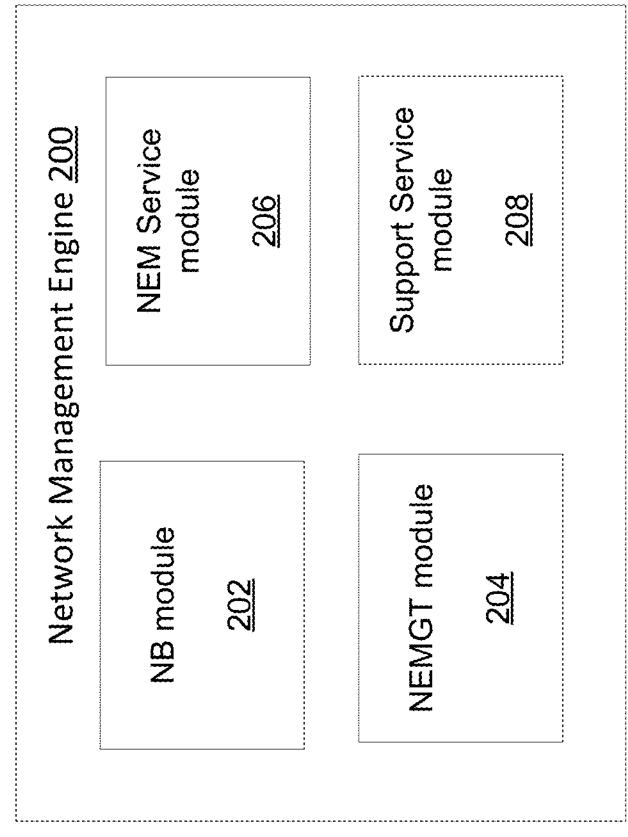
FIG. 2 is a block diagram illustrating components of an exemplary system according to some embodiments of the present disclosure.

As depicted in FIG. 2, network management engine 200 can include, but is not limited to, northbound (NB) service module 202, NE management (NEMGT) service module 204, NE mapper (NEM) service module 206 and support service module 208.

In some embodiments, NB service module 202 can receive management requests for NEs. In some embodiments, the management requests can correspond to NE registration and/or configuration requests, and/or configuration/operational queries. According to some embodiments, NB service module 202 can provide "northbound" operations, which can be utilized within and/or part of a Software Defined Network (SDN). In some embodiments, northbound operations can correspond to, involve and/or provide interfaces that are exposed to an upstream system, device, network and/or user, which can correlate to operational support systems (OSS) that can communicate through the northbound interfaces to utilize the SDN services.

In some embodiments, NEMGT service module 204 is configured to perform NE configuration via direct interaction with specified NEs. NEMGT service module 204 can perform NE connection establishment, native configuration and/or queries for specified services (e.g., NETCONF operations over SSH, gNMI operations over gRPC, CLI/TL1 operations over SSH, and the like).

In some embodiments, NEM service module 206 is configured to assign NEs to and/or establish NEs for NEMGT service instances, which in some embodiments, can be effectuated via cluster application program interfaces (APIs).

In some embodiments, support service module 208 is configured to perform configured operations for specified NE calls, registrations, configurations and/or operations, which can be predicated and/or based on the NE registration/configuration provided via module 202-206's operation. In some embodiments, module 208 can provide, but is not limited to, a database (DB) service, metrics service, bus service, and the like. For example, DB service can store mapping information and corresponding NE data/metadata; metrics service can collect performance metrics about NEMGT service instances; and bus service can relay NE connectivity status updates from an NEMGT service instance to a NEM service instance.

Specific operations of each component 202-206, as well as engine 200 as a whole (e.g., cluster) are discussed in more detail below respective to the steps of Process 300 of FIG. 3 and non-limiting example embodiments discussed in view of FIG. 4. Accordingly, modules 202, 204 and 206 (of engine 200 in FIG. 2) correspond to services 404, 410 and 406 (of FIG. 4, discussed infra), respectively; and support services module 208 (of FIG. 2) corresponds to services 402 and 408 of FIG. 4.

According to some embodiments, as discussed in more detail below, engine 200 may be configured to implement and/or control a plurality of services and/or microservices, where each of the plurality of services/microservices are configured to execute a plurality of workflows associated with performing the disclosed network management. Non-limiting examples are discussed in more detail below.

It should be understood that the engine(s) and modules discussed herein are non-exhaustive, as additional or fewer engines and/or modules (or sub-modules) may be applicable to the embodiments of the systems and methods discussed. More detail of the operations, configurations and functionalities of engine 200 and each of its modules, and their role within embodiments of the present disclosure will be discussed below in relation to FIGS. 3 and 4.

Figure 3:
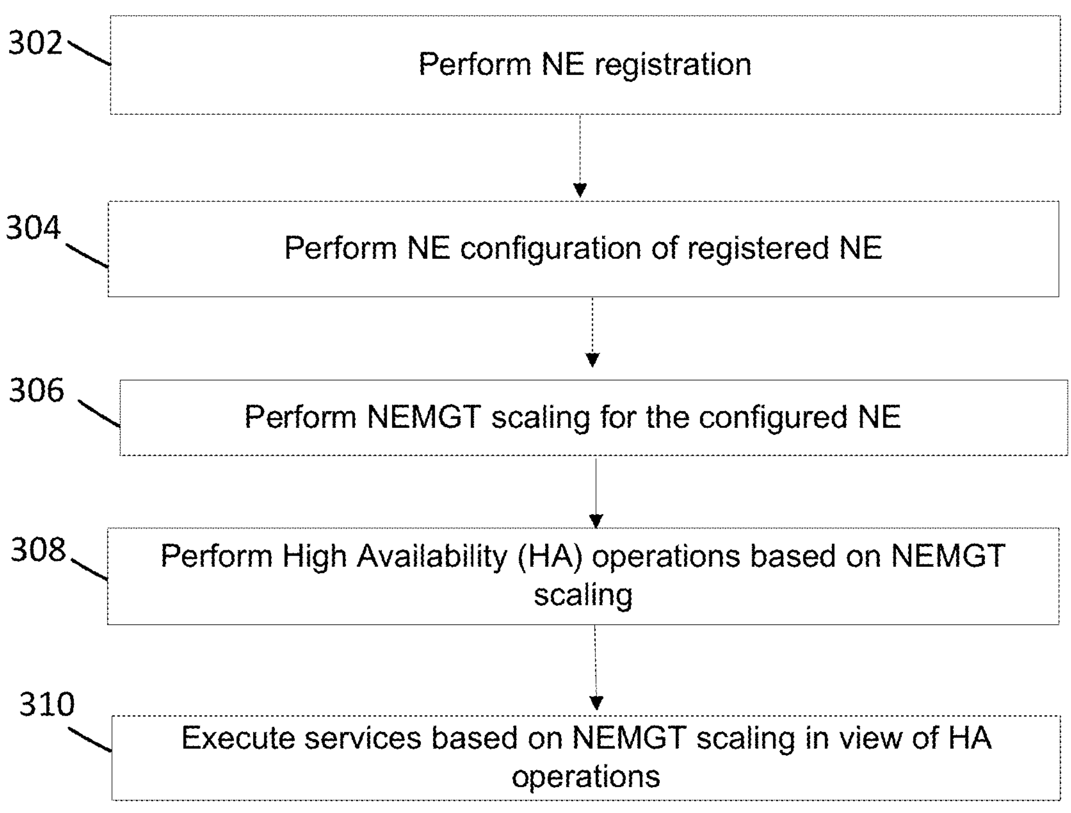
FIG. 3 illustrates an exemplary workflow according to some embodiments of the present disclosure.

FIG. 3 provides Process 300 which details non-limiting example embodiments of the network management engine 200's implementation for NE management. According to some embodiments, Step 302 of Process 300 can be performed by NB service module 202 of network management engine 200 (i.e., NB service 404 of FIG. 4); Step 304 can be performed by NEMGT service module 204 (i.e., NEMGT services 410); Steps 306-308 can be performed by NEM service module 206 (i.e., NB service 404); and Step 310 can be performed by support service module 208 (i.e., DB service 402 and bus service 408).

Process 300 begins with Step 302 where engine 200 performs registration of an NE. Accordingly, as discussed herein, NE registration results in a NEMGT service being assigned to the NE. In some embodiments, the NE registration in Step 302 can be triggered via a request from a user/device, whereby the request can identify a specific NE, a type of NE, a type of service, a specific service, and the like, or some combination thereof.

Figure 4:
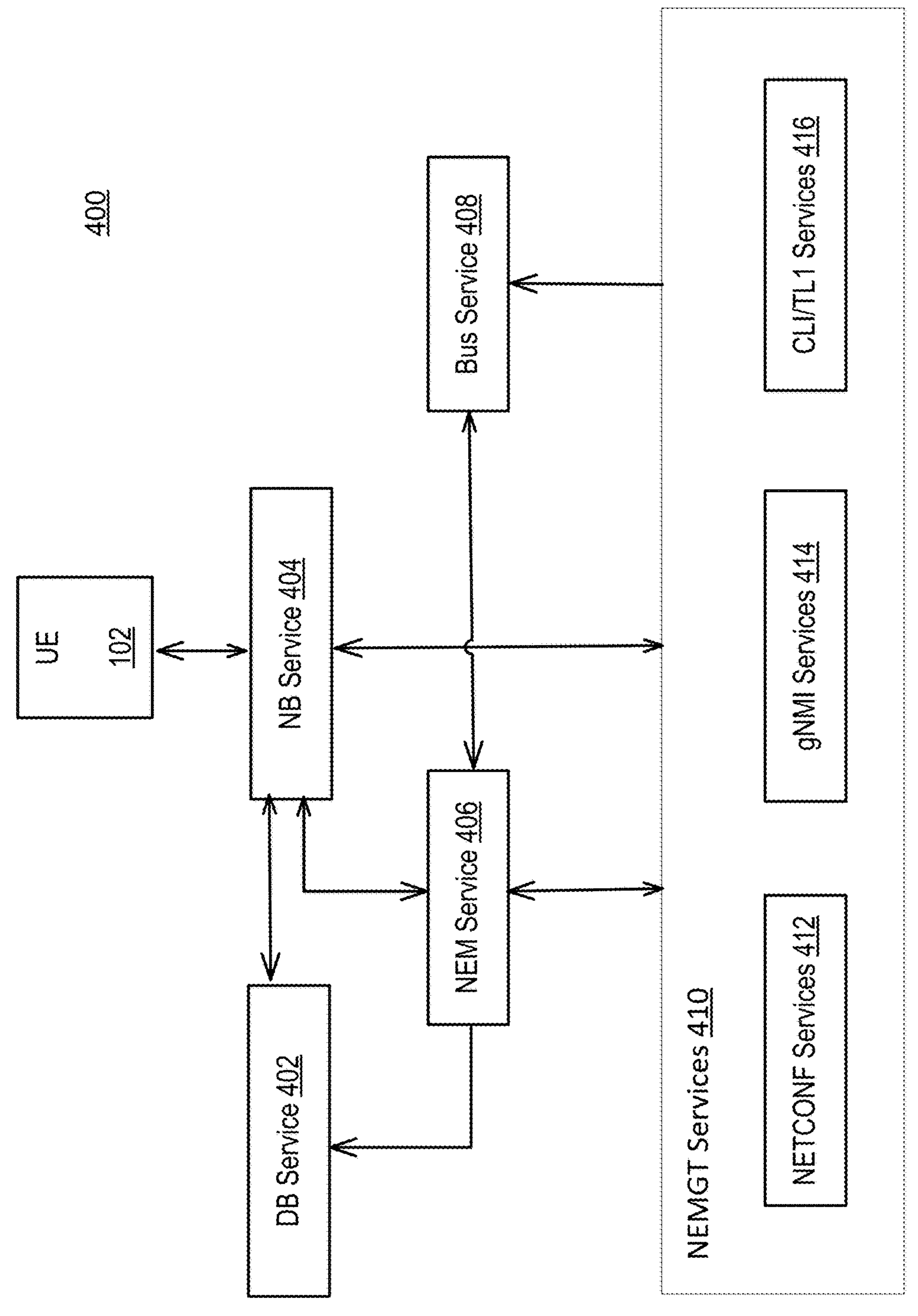
FIG. 4 illustrates a non-limiting example embodiment of the present disclosure.

As depicted in network configuration 400 of FIG. 4, in some embodiments, UE 102 can communicate a NE registration request to NB service 404. In some embodiments, for example, the request can identify a NETCONF service 412 within NEMGT services 410 (which can also host, as depicted in FIG. 4, gNMI services 414 and CLI/TL1 services 416, for example). In response, NB service 404 communicates a NEM request to NEM service 406 to register the NE. NEM service 406 then performs NE mounting on a particular NEMGT service 410.

According to some embodiments, NE mounting can be specific to a type of protocol, and can be utilized to establish and/or maintain instances of connectivity for a NE to a specific service. In some embodiments, NE specific data models, as discussed above, can be leveraged to perform such mounting in relation to a specified service, which as discussed below, can facilitate NE configuration. In some embodiments, a service cluster (e.g., NETCONF service 412, for example), can include a set of service instances, whereby such mounting can correspond to a set, subset or all of service instances.

In some embodiments, if mounting fails on any requested instance (e.g., request mounting on all service instances but not all are successful), then NE registration can be considered unsuccessful (and the processing herein can be re-requested). In some embodiments, upon an unsuccessful mount of even one (1) requested instance, other mounted service instances may be caused to be un-mounted.

In some embodiments, upon the successful mounting of the NE to each intended service instance, NEMGT Services 410 can establish the specified service connection for each instance. For example, if the service instances correspond to NETCONF services 412, then each instance under services 412 can have an established connection with the NE. Accordingly, such connection(s) can be published to bus service 408, which can consume NE status updates for each NE connected instance that can be stored in DB service 402. NEM service 406 then provides a communication to NB service 404 that the registration of the NE was successful, which can then be provided back to UE 102.

Accordingly, NE registration in Step 302 enables the mapping for new or existing NEs to specified NEMGT services.

In Step 304, engine 200 can perform NE configuration for the registered NE. According to some embodiments, with reference to FIG. 4, Step 304 can involve configuration operations for the NE that involve a configuration/data retrieval request for the NE can be received by NB Service 404. Then, a NE-to-NEMGT service mapping for each protocol can be retrieved from the DB Service 402. NB Service 404 can then identify the protocol (e.g., NETCONF) that needs to be used for the particular NE configuration, and the corresponding NEMGT service (e.g., NETCONF services 412) to which the NE is mapped. NB Service 404 directs the configuration/retrieval request to NEMGT service 410 (e.g., a particular subset of instances of services 412, for example). Upon a particular NEMGT instance(s) receiving the request (which, in some embodiments, can involve a service instance selection being performed via cluster service routing), native protocol of the specified service (e.g., NETCONF) can be utilized to configure the NE. In some embodiments, instances of the service can be selected randomly or according to a load balancing operation. Accordingly, a configuration response can be provided to UE 102.

In Step 306, engine 200 can perform NEMGT scaling for the configured NE. According to some embodiments, the scaling of the NEMGT services can be to "scale-up" and/or "scale-down", and can correspond to a scaling criteria, which upon detection, can trigger such scaling. In some embodiments, such criteria can correspond to NEMGT metric thresholds, which can include, but are not limited to, a number of NEs per NEMGT instance, average number of instances per NE and/or per NEMGT service, central processing unit (CPU) utilization, device, NE or connection failures and/or disconnections, and the like, or some combination thereof.

According to some embodiments, with reference to FIG. 4, NEM service 406 can periodically and/or consistently monitor a cluster to track corresponding scaling metrics (via asynchronous alerts or by polling), from which such scaling can be caused to be performed.

In some embodiments, when scaling-up protocols are triggered (e.g., NEM service 406 identifies that a scale-up metric threshold is at least exceeded for a particular NEMGT service 410 (e.g., NETCONF service 412)), NEM service 406 can update cluster configurations to include an additional NEMGT services (e.g., new NEMGT instances). Accordingly, for subsequent NE registrations (e.g., performance of Step 302, discussed supra), NEM service 406 can utilize its normal selection algorithm (e.g. least loaded) to select a NEMGT service, as the NEMGT service pool will have included therein any newly deployed NEMGT services.

In some embodiments, when scaling-down protocols are triggered (e.g., NEM service 406 identifies that a scale-down metric is lower than a predetermined threshold for a NEMGT service 410), NEM service 406 can identify which NEs are currently mapped to such NEMGT service 410. Accordingly, in some embodiments, NEM service 406 can determine whether the identified NEs can be registered across the rest of the NEMGT services without violating the scale-up criteria.

In some embodiments, if such registration is capable of being performed without such violation occurring, NEM service 406 can determine to scale down (e.g., un-deploy a NEMGT service 410), upon which the NEM service 406 can i) register each of the affected NEs to another NEMGT service (e.g., according to normal selection algorithm), ii) update the NE-to-NEMGT mapping for each NE in the DB service 402 to point to the newly selected service; and iii) delete (e.g., un-deploys) the NEMGT service 410 that originally triggered the scale-down.

In Step 308, engine 200 can perform High Availability (HA) operations (or functionality). In some embodiments, such HA operations can correspond to, but are not limited to, cluster instance maintenance, NEMGT instance failure, instance recovery, device disconnection handling and device reconnection handling, and the like.

According to some embodiments, cluster instance management (and monitoring assumptions) can involve the detection of instance failures via health checks, for example, whereby such failures, instances and/or NE-to-instance mappings can be identified/marked as "unhealthy". Cluster service routing ensures that services can communicate with one another as long as one healthy instance per service is healthy. Therefore, cluster management can ensure that all service instances are "brought-up" (or made "healthy" before initiating a set of operations.

In some embodiments, NEMGT instance failure can involve the detection of instance failures via NEM service 406. In some embodiments, failures can be marked as "partially connected" so users are not reliant on such instances, and they can be readily identified for maintenance. For example, an instance is "healthy"; however, one or more instances cannot connect to a registered/configured NE. Accordingly, in a similar manner as discussed above, cluster service routing ensures that NB service 404 can still communicate with NEs via the at least one NEMGT instance per NE. It should be understood that when all NEMGT instances are down, NB service 404 requests to NEMGT services 410 will fail (e.g., need at least one active service instance to prevail on a request).

In some embodiments, instance recovery can involve NEM service 406 detecting an instance recovery operation, whereby NEM service 406 can identify NEs managed by the NEMGT service 410 to which a recovered instance belongs, and perform mounting operations (in a similar manner as discussed above). Accordingly, upon such re-mounting, NEM service 406 can mark the NE(s) as connected in DB service 402 when all NEMGT instances are connected and/or available.

In some embodiments, device disconnection handling can involve NEM service 406 detecting a NE disconnection from a NEMGT instance (e.g., an instance of NETCONF service 412). In some embodiments, NEM service 406 can dynamically create a new NEMGT service 410 and maps the NE to the newly created service. In some embodiments, new services can include all instances of the NE's original NEMGT service, minus the one(s) from which the NE is disconnected. According to some embodiments, such device disconnection handling can ensure that cluster service routing will not route NE configuration requests towards NEMGT instances to which the NE is not connected.

In some embodiments, device reconnection handling can involve NEM service 406 detecting NE connectivity re-establishment to a NEMGT instance (e.g., a service instance of NETCONF service 412), upon which NEM service 406 can map the NE to the NEMGT service 410 related to the re-established NEMGT instance. In some embodiments, such re-mapping can involve the NE being mapped to each instance of the particular NEMGT service 410 (e.g., NETCONF service 412).

And, in Step 310, engine 200 can execute the connected services for the NE (and requesting user/device, for example UE 102) based on the NEMGT scaling in view of the performed HA operations. Such execution can ensure that services can be maintained for the specified operations such that "best of breed" technologies can be customized and applied to specific operating environments.

Figure 5:
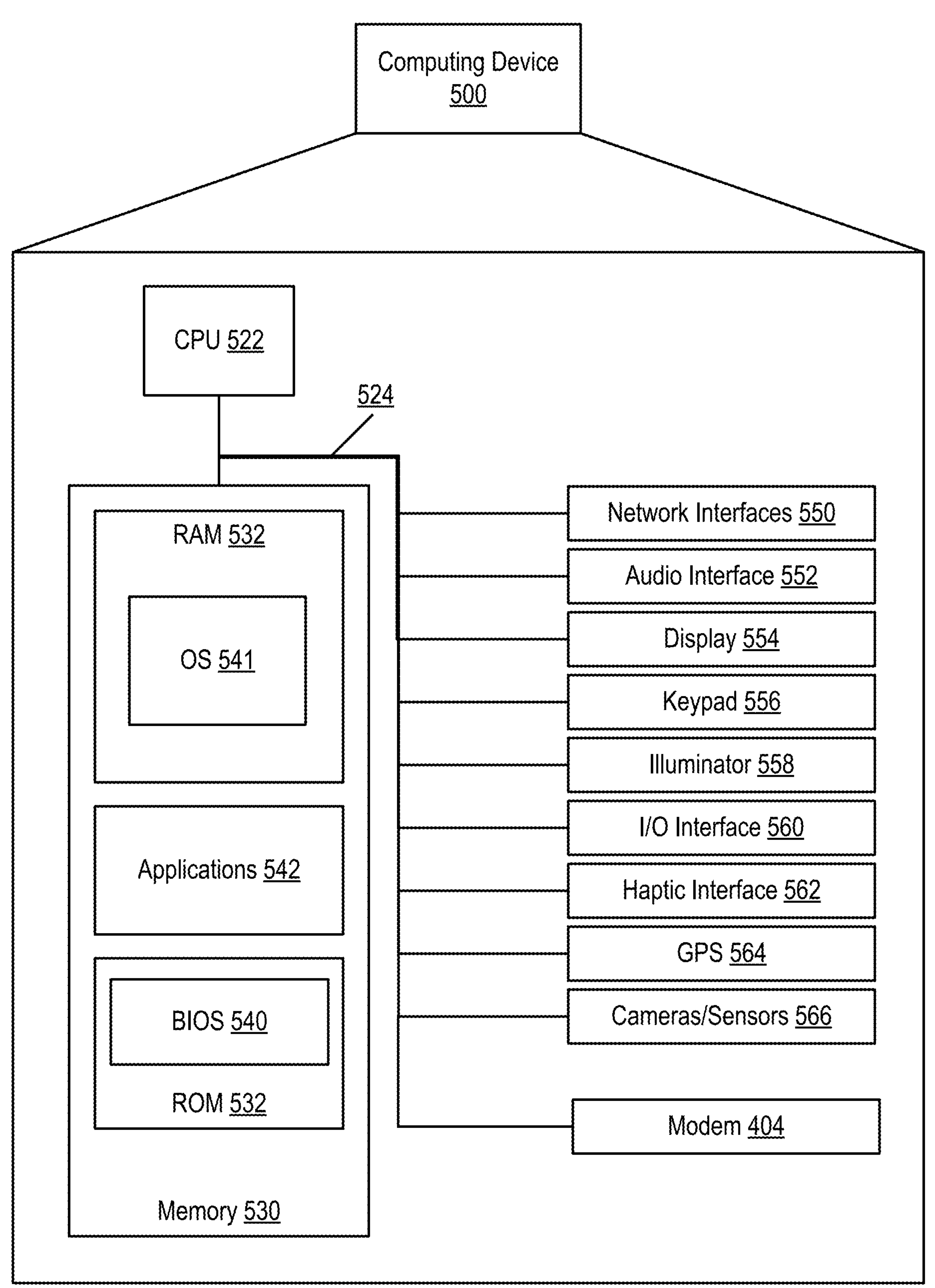
FIG. 5 is a block diagram illustrating a computing device showing an example of a client or server device used in various embodiments of the present disclosure.

FIG. 5 is a block diagram illustrating a computing device showing an example of a client or server device used in the various embodiments of the disclosure.

The computing device 500 may include more or fewer components than those shown in FIG. 5, depending on the deployment or usage of the device 500. For example, a server computing device, such as a rack-mounted server, may not include audio interfaces 552, displays 554, keypads 556, illuminators 558, haptic interfaces 562, GPS receivers 564, or cameras/sensors 566. Some devices may include additional components not shown, such as graphics processing unit (GPU) devices, cryptographic co-processors, artificial intelligence (AI) accelerators, or other peripheral devices.

As shown in FIG. 5, the device 500 includes a CPU 522 in communication with a mass memory 530 via a bus 524. The computing device 500 also includes one or more network interfaces 550, an audio interface 552, a display 554, a keypad 556, an illuminator 558, an input/output interface 560, a haptic interface 562, an optional global positioning systems (GPS) receiver 564 and a camera(s) or other optical, thermal, or electromagnetic sensors 566. Device 500 can include one camera/sensor 566 or a plurality of cameras/sensors 566. The positioning of the camera(s)/sensor(s) 566 on the device 500 can change per device 500 model, per device 500 capabilities, and the like, or some combination thereof.

In some embodiments, the CPU 522 may comprise a general-purpose CPU. The CPU 522 may comprise a single-core or multiple-core CPU. The CPU 522 may comprise a system-on-a-chip (SoC) or a similar embedded system. In some embodiments, a GPU may be used in place of, or in combination with, a CPU 522. Mass memory 530 may comprise a dynamic random-access memory (DRAM) device, a static random-access memory device (SRAM), or a Flash (e.g., NAND Flash) memory device. In some embodiments, mass memory 530 may comprise a combination of such memory types. In one embodiment, the bus 524 may comprise a Peripheral Component Interconnect Express (PCIe) bus. In some embodiments, the bus 524 may comprise multiple busses instead of a single bus.

Mass memory 530 illustrates another example of computer storage media for the storage of information such as computer-readable instructions, data structures, program modules, or other data. Mass memory 530 stores a basic input/output system ("BIOS") 540 for controlling the low-level operation of the computing device 500. The mass memory also stores an operating system 541 for controlling the operation of the computing device 500.

Applications 542 may include computer-executable instructions which, when executed by the computing device 500, perform any of the methods (or portions of the methods) described previously in the description of the preceding Figures. In some embodiments, the software or programs implementing the method embodiments can be read from a hard disk drive (not illustrated) and temporarily stored in RAM 532 by CPU 522. CPU 522 may then read the software or data from RAM 532, process them, and store them to RAM 532 again.

The computing device 500 may optionally communicate with a base station (not shown) or directly with another computing device. Network interface 550 is sometimes known as a transceiver, transceiving device, or network interface card (NIC).

The audio interface 552 produces and receives audio signals such as the sound of a human voice. For example, the audio interface 552 may be coupled to a speaker and microphone (not shown) to enable telecommunication with others or generate an audio acknowledgment for some action. Display 554 may be a liquid crystal display (LCD), gas plasma, light-emitting diode (LED), or any other type of display used with a computing device. Display 554 may also include a touch-sensitive screen arranged to receive input from an object such as a stylus or a digit from a human hand.

Keypad 556 may comprise any input device arranged to receive input from a user. Illuminator 558 may provide a status indication or provide light.

The computing device 500 also comprises an input/output interface 560 for communicating with external devices, using communication technologies, such as USB, infrared, Bluetooth™, or the like. The haptic interface 562 provides tactile feedback to a user of the client device.

The optional GPS transceiver 564 can determine the physical coordinates of the computing device 500 on the surface of the Earth, which typically outputs a location as latitude and longitude values. GPS transceiver 564 can also employ other geo-positioning mechanisms, including, but not limited to, triangulation, assisted GPS (AGPS), E-OTD, CI, SAI, ETA, BSS, or the like, to further determine the physical location of the computing device 500 on the surface of the Earth. In one embodiment, however, the computing device 500 may communicate through other components, providing other information that may be employed to determine a physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

To the extent the aforementioned implementations collect, store, or employ personal information of individuals, groups, or other entities, it should be understood that such information shall be used in accordance with all applicable laws concerning the protection of personal information. Additionally, the collection, storage, and use of such information can be subject to the consent of the individual to such activity, for example, through well known "opt-in" or "opt-out" processes as can be appropriate for the situation and type of information. Storage and use of personal information can be in an appropriately secure manner reflective of the type of information, for example, through various access control, encryption, and anonymization techniques (for especially sensitive information).

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

What is claimed is:

1. A method comprising:

executing, by a network device, configuration operations for configuration of a network element (NE) respective to a set of instances of a network service, the configuration of the NE being based on a mapping of the NE to each instance in the set of instances;

causing, by the network device, execution of scaling operations based on detected NE management thresholds related to at least one of a number of NEs per network instance, average number of instances, disconnections, failures, or central processing unit (CPU) utilization;

maintaining, by the network device, availability of the NE mapping to the set of instances via execution of an availability operation, the availability operation comprising operations to:

detect an instance failure among the set of instances, create, in response to the detected instance failure, a new network service and corresponding service instances, map the NE to the service instances of the new network service, the service instances including all instances in the set of instances minus the failed instance, and reestablish the configuration of the NE by reconfiguring the NE based on the mapping to the new network service; and causing, by the network device, execution of the new network service via user equipment (UE) in accordance with the maintained NE mapping.

2. The method of claim 1, further comprising:

receiving, by the network device and prior to executing the configuration operations, a request from the UE, the request comprising information identifying the network service; and mounting and mapping, based on the received request, the NE to each of the set of instances of the network service to register the NE with the network service.

3. The method of claim 2, wherein the configuration operations are based on the registration of the NE with the network service.

4. The method of claim 1, further comprising:

monitoring, by the network device and prior to executing the scaling operations, the network service according to the NE management thresholds;

collecting, by the network device and based on the monitoring, network statistics corresponding to network activity of the network service; and determining, based on the collected network statistics, the scaling operations for the network service.

5. The method of claim 4, wherein the determined scaling operations comprise adding at least one additional network instance to the network service.

6. The method of claim 4, wherein the scaling operations comprise deleting at least one network instance from the set of instances, the at least one network instance being an instance that corresponds to the network statistics.

7. The method of claim 1, further comprising:

detecting, by the network device, an instance failure among the service instances; and reconfiguring the NE for the failed service instance.

8. The method of claim 7, wherein the reconfiguration of the NE for the failed service instance comprises performing instance recovery operations for the failed service instance that result in re-registration and reconfiguration of the failed service instance.

9. A network device comprising:

a processor configured to:

execute configuration operations for configuration of a network element (NE) respective to a set of instances of a network service, the configuration of the NE being based on a mapping of the NE to each instance in the set of instances;

cause execution of scaling operations based on detected NE management thresholds related to at least one of a number of NEs per network instance, average number of instances, disconnections, failures, or central processing unit (CPU) utilization;

maintain availability of the NE mapping to the set of instances via execution of an availability operation, the availability operation comprising operations to:

detect an instance failure among the set of instances, create, in response to the detected instance failure, a new network service and corresponding service instances, map the NE to the service instances of the new network service, the service instances including all instances in the set of instances minus the failed instance, and reestablish the configuration of the NE by reconfiguring the NE based on the mapping to the new network service; and cause execution of the new network service via user equipment (UE) in accordance with the maintained NE mapping.

10. The network device of claim 9, wherein the processor is further configured to:

receive, prior to executing the configuration operations, a request from the UE, the request comprising information identifying the network service; and mount and map, based on the received request, the NE to each of the set of instances of the network service to register the NE with the network service, wherein the configuration operations are based on the registration of the NE with the network service.

11. The network device of claim 9, wherein the processor is further configured to:

monitor, prior to executing the scaling operations, the network service according to the NE management thresholds;

collect, based on the monitoring, network statistics corresponding to network activity of the network service; and determine, based on the collected network statistics, the scaling operations for the network service, such that:

when the scaling operations correspond to scale-up operations, add at least one additional network instance to the network service; and when the scaling operations correspond to scale-down operations, delete at least one network instance from the set of instances, the at least one network instance being an instance that corresponds to the network statistics from which the scale-down determination is based.

12. The network device of claim 9, wherein the processor is further configured to:

detect an instance failure among the service instances; and reconfigure the NE for the failed service instance, wherein the reconfiguration of the NE for the failed service instance comprises performing instance recovery operations for the failed service instance that result in re-registration and reconfiguration of the failed service instance.

13. A non-transitory computer-readable storage medium storing instructions that, when executed by a processor of a network device, cause the network device to:

execute configuration operations for configuration of a network element (NE) respective to a set of instances of a network service, the configuration of the NE being based on a mapping of the NE to each instance in the set of instances;

cause execution of scaling operations based on detected NE management thresholds related to at least one of a number of NEs per network instance, average number of instances, disconnections, failures, or central processing unit (CPU) utilization;

maintain availability of the NE mapping to the set of instances via execution of an availability operation, the availability operation comprising operations to:

detect an instance failure among the set of instances, create, in response to the detected instance failure, a new network service and corresponding service instances, map the NE to the service instances of the new network service, the service instances including all instances in the set of instances minus the failed instance, and reestablish the configuration of the NE by reconfiguring the NE based on the mapping to the new network service; and cause execution of the new network service via user equipment (UE) in accordance with the maintained NE mapping.

14. The non-transitory computer-readable storage medium of claim 13, wherein the network device is further caused to:

receive, prior to executing the configuration operations, a request from the UE, the request comprising information identifying the network service; and mount and map, based on the received request, the NE to each of the set of instances of the network service to register the NE with the network service, wherein the configuration operations are based on the registration of the NE with the network service.

15. The non-transitory computer-readable storage medium of claim 13, wherein the network device is further caused to:

monitor, prior to executing the scaling operations, the network service according to the NE management thresholds;

collect, based on the monitoring, network statistics corresponding to network activity of the network service; and determine, based on the collected network statistics, the scaling operations for the network service, such that:

when the scaling operations correspond to scale-up operations, add at least one additional network instance to the network service; and when the scaling operations correspond to scale-down operations, delete at least one network instance from the set of instances, the at least one network instance being an instance that corresponds to the network statistics from which the scale-down determination is based.

16. The non-transitory computer-readable storage medium of claim 13, wherein the network device is further caused to:

detect an instance failure among the service instances; and reconfigure the NE for the failed service instance, wherein the reconfiguration of the NE for the failed service instance comprises performing instance recovery operations for the failed service instance that result in re-registration and reconfiguration of the failed service instance.

17. The method of claim 1, further comprising storing information related to the NE mapping within a database, the information indicating a type of NE mapping, the information being retrievable for use upon initiation of a set of operations.

18. The network device of claim 9, wherein the processor is further configured to store information related to the NE mapping within a database, the information indicating a type of NE mapping, the information being retrievable for use upon initiation of a set of operations.

19. The non-transitory computer-readable storage medium of claim 13, wherein the network device is further caused to store information related to the NE mapping within a database, the information indicating a type of NE mapping, the information being retrievable for use upon initiation of a set of operations.

* * * * *